United States Patent [19]
Bürger et al.

[11] 3,960,761
[45] June 1, 1976

[54] PRODUCTION OF STRONG ACTIVE CARBON MOLDINGS

[75] Inventors: Alex Bürger, Cologne; Hermann Kaiser, Leverkusen; Werner Ludovici, Cologne, all of Germany

[73] Assignee: Bayer Aktiengesellschaft, Leverkusen, Germany

[22] Filed: Apr. 23, 1974

[21] Appl. No.: 463,641

[30] Foreign Application Priority Data
May 5, 1973 Germany............................ 2322706

[52] U.S. Cl................................ 252/421; 252/428; 252/444; 252/445
[51] Int. Cl.²........................................... B01J 21/18
[58] Field of Search ............ 252/445, 421, 428, 444

[56] References Cited
UNITED STATES PATENTS

| | | | |
|---|---|---|---|
| 1,968,846 | 8/1934 | Morrell............................ | 252/445 X |
| 2,008,148 | 7/1935 | Morrell............................ | 252/445 X |
| 2,516,233 | 7/1950 | McKinnis.......................... | 252/421 |
| 2,586,889 | 2/1952 | Vesterdal et al................ | 252/445 X |
| 2,721,184 | 10/1955 | Voorhies............................ | 252/445 |
| 3,557,020 | 1/1971 | Shindo et al..................... | 252/445 X |
| 3,822,218 | 7/1974 | Whittaker et al................. | 252/421 |

*Primary Examiner*—Patrick P. Garvin
*Attorney, Agent, or Firm*—Burgess, Dinklage & Sprung

[57] ABSTRACT

In the production of break-resistant and abrasion-resistant shaped structures of active carbon, comprising the steps of molding a finely divided, carbon-containing starting material with a binder, hardening the molding, eliminating volatile constituents from the molding composition and activating the moldings at a temperature of about 700° to 1200°C with at least one of steam and carbon dioxide, the improvement which comprises molding the carbon-containing material with a binder comprising a mixture of a phenol and an aldehyde or a condensation product thereof. The carbon-containing starting material may contain volatiles and hardening is effected in two stages with elimination of volatiles, the first stage up to about 150 to 200°C and the second stage up to about 600 to 700°C. The moldings are characterized by a benzene-adsorption capacity in excess of about 25 %, a methylene blue number of at least about 10, an abrasion of less than about 0.6 %, a breakage of less than about 0.8 % and a compression hardness of at least about 15 kp.

5 Claims, No Drawings

PRODUCTION OF STRONG ACTIVE CARBON MOLDINGS

This invention relates to hard, break-resistant and abrasion-resistant active carbon moldings and to a process for the production thereof from mixtures of finely powered materials rich in carbon and binders based on phenolaldehyde mixtures and/or their condensation products, by molding and hardening under heat to liberate volatile constituents, followed by gas activation.

Molded active carbons are used for a variety of different purposes. They are used for bleaching and purifying liquids, for extracting and recovering volatile materials, for purifying gases and as catalysts and catalyst supports.

In general, these products are applied by passing the media to be treated through a stationary or gently moving carbon bed. For reasons of flow technology, it is necessary to use as uniform a material as possible so as to offer minimal resistance in terms of shape. Similarly, a material from which fine particles are separated by abrasion under working conditions is unfavorable. In addition, active carbons also have to be able to withstand repeated regeneration without excessive abrasion or breakage of the granules.

Molded active carbons can be produced by various different methods:

Powdered active carbons may be molded, for example, with solutions of polymers, such as for example carboxymethyl cellulose or cellulose acetate, polyacrylonitrile, polyesters, polyethylene, alkyl sulfonates and similar substances, and dried. In some cases, the dried moldings are subsequently subjected to a pyrolysis process. However, pyrolysis should only be applied in cases where the binder leaves behind a coke-like residue during pyrolysis.

Materials normally referred to fuels with lower C-content and high in volatiles for example size-reduced wood waste (sawdust), peat, straw, nutshells and the like, may be mixed with aqueous solutions of zinc chloride or phosphoric acid, and the resulting mixtures may be molded dried and activated by conventional methods.

Extensively carbonized material with a high C-content and normally still with a content of volatiles such as, for example, mineral coal, brown-coal coke, peat coke, petroleum coke, coco-nut shell coke, coke from acid sludge, residues from the low-temperature carbonization of synthetic resins, charcoal or mixtures of these substances, may be mixed with binders such as tar, pitch, bitumens, asphalt and/or fractions of these mixtures of substances, or with sulfite waste liquor, and the resulting mixtures may be molded, optionally dried, carbonized at low temperature and activated in a conventional manner with steam and/or carbon dioxide.

Synthetic resins, such as, for example, polyvinylidene chloride, styrene, divinyl resins, polyfurfuryl alcohol, furfuryl-aldehyde resins or phenol-aldehyde resins, may be activated with activating gases in a known manner after low-temperature carbonization.

The active carbon moldings by the process described above are not sufficiently abrasion- and break-resistant for a number of applications. In some cases, the binders used have an adverse effect upon adsorption properties, or residues of the activating agent or of the binder are left behind and give rise to problems in subsequent application.

Accordingly, the object of the invention is to provide a molded, hard (i.e. abrasion-resistant and break-resistant) active carbon having favorable flow-promoting and adsorption properties. In accordance with the invention, this object is realized by a modification of the basic process for the production of break-resistant and abrasion-resistant shaped structures of active carbon, comprising the steps of molding a finely divided, carbon containing starting material with a binder, hardening the molding, eliminating volatile constituents therefrom and activating the molding at a temperature of about 700° to 1200°C with at least one of steam and carbon dioxide. Specifically, the novel modification comprises molding the carbon-containing material with a binder comprising a mixture of a phenol and an aldehyde or a condensation product thereof.

To produce the moldings, approximately 30 to 85 % by weight, preferably about 75 to 85 % by weight, of finely divided carbon-containing material (based on dry weight at 100°C) is mixed with 70 to 15 % by weight, preferably with 15 to 25 % by weight, of binder, and the resulting mixture is molded. The resulting moldings are dried and hardened at temperatures of about 20° to 750°C, at which volatile products are liberated.

Surprisingly, active carbons, having a break and abrasion resistance which could not be obtained by conventional processes, are left after activation. Their adsorption properties are also favorable, so that universally usable active carbons are obtained.

The carbon-containing starting materials may be lowash mineral coals containing from about 10 to 30 % by weight of volatile fractions, determined by heating to 750°C, anthracite, carbonized lignites, lignite briquettes, peat coke, coco-nut shell coke, petroleum coke, coking residue of acid sludge from the refining of lubricating oil, and coke-like residues from the thermal decomposition of synthetic resins, either individually or in admixture with other starting materials.

The starting materials are so finely ground that most of them pass through a screen with a mesh width of 0.075 mm. The phenols and aldehydes used as binders can be employed in admixture, in the form of partly condensed preliminary and intermediate stages, in fully condensed form and/or in the form of residues of the kind formed during the production and processing of these products. They are mixed with the carbon-containing materials in liquid form, in the form of solutions in water, alcohols or hydrocarbons, in the form of a fine powder or in molten form. In cases where noncondensed or partly condensed products are used, alkaline or acid catalysts can be added before, during or after molding. These catalysts have the effect of completing condensation and accelerating hardening.

In the case of fusible resins, it is advisable to carry out molding in the presence of substances which liberate formaldehyde when the moldings are subsequently heated, such as, for example, paraformaldehyde or hexamethylene tetramine. In cases where powdered resins are used, the resin is mixed with the material rich in carbon and a preferably water-soluble substance having binding properties, such as, for example, carboxymethyl cellulose, starch paste or an alkylbenzene sulfonate, is added for temporary binding before and during heating.

In general, the phenolic binder component can be phenols of the kind which are able to form condensation products with aldehydes. In the main, readily accessible phenols are used. Thus, it is possible to use monohydric and polyhydric phenols, such as, for example, phenol, pyrocatechol, resorcinol or hydroquinone; alkyl-substituted phenols such as, for example, cresols or xylenols; polynuclear monohydric or polyhydric phenols such as, for example, naphthols, p,p'-dihydroxydiphenyl dimethylmethane or hydroxyanthracenes; and compounds which, in addition to phenolic OH-groups, contain additional functional groups such as, for example, phenol sulfonic acids, phenols containing carboxyl groups such as, for example, salicylic acid, and even compounds which are able to react as phenolic hydroxyl, such as for example phenol ethers. Crude phenols or crude cresols are particularly suitable, as are residues, waste products and decomposition products which contain phenol or from which phenols can be liberated.

The phenols can also be used in admixture with non-phenolic compounds which, like urea and melamine for example, are able to react with aldehydes in the same way as phenol.

Similarly, readily accessible aldehydes, for example formaldehyde and its polymers (paraformaldehyde or polyoxymethylene) and acetaldehyde, especially in the form of paraldehyde, are used as the aldehydic binder component. In addition, it is also possible to use other aliphatic or aromatic, monohydric or polyhydric, saturated or unsaturated aldehydes such as, for example, butyraldehyde, benzaldehyde, salicylaldehyde, furfurol, acrolein, crotonaldehyde, glyoxal or mixtures of these aldehydes. Hexamethylene tetramine can also be used with advantage as a binder component. Furthermore, it is possible to use residues, waste products and decomposition products which contain aldehydes or from which aldehydes can be liberated.

Preferred aldehydes include formaldehyde, metaldehyde, paraldehyde, acetaldehyde and benzaldehyde.

The stoichiometric proportions, i.e. —OH per —CHO radical is in the range of from 1 to 0.75 up to 1 to 3 and preferably in the range of from 1 to 1 up to 1 to 2.

In general, the phenols and aldehydes which can be used in accordance with the invention can be represented by the formulae (I) and (II) respectively:

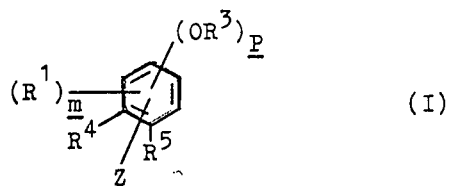

(I)

(II)

the products formed during condensation corresponding to the general formula

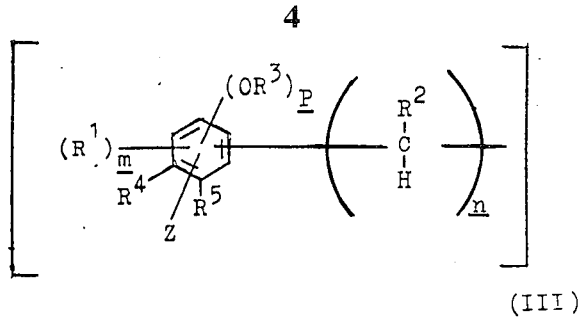

(III)

in which

Z represents H, SO$_3$H, halogen or COOH;

R$_1$ to R$_5$ which may be the same or different represent hydrogen or an organic radical, preferably branched or linear alkyl-radicals, especially C$_1$- to C$_6$-alkyl-radicals; C$_5$- or C$_6$-cycloalkyl-radicals, preferably phenyl-, diphenyl- or naphthyl-radicals;

R$_4$ and R$_5$ together can also form another C$_5$- or C$_6$-ring, annelated to the benzene ring, preferably forming naphthalene.

R$_2$ can also form part of a cycloaliphatic 5, 6, 7 or 8 C-ring;

$n = 2$ or 3;

$m = 0$ to 3 (if $m$ is greater than 1, R$_1$ is in the meta-position to the OR$_3$-group;

P = 1 to 3.

As already stated, the aforementioned phenols and aldehydes can be added as such in admixture to the carboncontaining materials to be bound, in which case condensation takes place during hardening of the moldings. However, condensation can also be carried out either completely or in part before admixture with the carbon-containing materials to be bound. Condensation is carried out by known methods, cf. for example Houben-Weyl.

The starting material, substantially ground to a grain size of less than 0.075 mm, is mixed with the liquid or dissolved binder and the resulting mixture is kneaded into a homogeneous, plastic mass.

In cases where the binder is in solution, additional solvents can be added before or during kneading. In cases where the binders are in the form of a melt, kneading is carried out at a temperature above the melting temperature, generally at temperatures in the range of from 50° to 150°C, in a heated apparatus.

In cases where solid binders are used, the binder should be ground to a grain size of the same order as the carbon-containing material. The binders are mixed and the resulting mixture is converted into plastic form in the presence of a solution of a material acting as an auxiliary binder, but only up to the low-temperature carbonization stage. Examples of suitable auxiliary binders include starch paste, carboxymethyl cellulose, cellulose acetate, alkylbenzene sulfonates and lignin sulfonates.

The auxiliary binders are added in the form of a dilute, aqueous or alcoholic solution in a quantity sufficient to plasticize the mass.

The plastic mixture is processed into moldings in a suitable apparatus, such as an extruder, screw extruder or briquetting machine. In cases where thermosetting binders are used, precautions must be taken to ensure that heat is not generated to any appreciable extend during kneading and molding. After molding, it is advisable to allow the moldings to stand for a certain time (about 1 to 24 hours, preferably about 4 to 12 hours), during which they solidify to a greater or lesser extent, depending upon the type of resin used. The moldings are then heated to around 150° to 200°C at a rate of about 30° to 60°C per hour. Solvents and volatile products escape during heating and hardening continues at a faster rate. It is advantageous to allow the temperature to rise slowly because otherwise softening may occur during molding cracks may develop in the material and the moldings might expand. Drying should be carried out, if possible, in a stationary bed or in a gently moving bed, for example in tunnel dryers, belt dryers or tubular rotary kilns.

After they have reached a temperature of about 150 to 200°C, the mouldings are heated to around 600° to 750°C at a rate of about 40° to 120°C per hour, preferably in a low-oxygen atmosphere, for example in the absence of air or, where the moldings are directly heated, with a deficit of air. This temperature range is maintained until no more volatile constituents escape. A period of 10 to 60 minutes after the final temperature has been reached is normally sufficient. Hardness increases even further during the low-temperature carbonization process. Heating to the final temperature of low-temperature carbonization should not be carried out too quickly because otherwise the material might crack or expand as in the case of overrapid drying. Lowtemperature carbonization is best carried out in directly or indirectly heated apparatus, for example multiple-shelf kilns or tubular rotary kilns, in which the material can be kept in constant motion. Activation is carried out as known per se by the action of steam and/or carbon dioxide at temperatures of about 700° to 1000°C in an apparatus normally used for this purpose, such as a tubular rotary kiln, multiple-shelf kiln or fluidization kiln.

The active carbons obtained by the process according to the invention have a benzene-absorption capacity of about 25 to 70 %, based on the quantity by weight of active carbon used, a methylene blue number of about 10 to 25, a break of about 0.3 to 0.8 %, an abrasion of about 0.1 to 0.6 and a compression hardness of about 15 to 25 kp.

The process according to the invention is illustrated by the following Examples. In the Examples, the adsorption properties and strength values were determined as follows:

a. Benzene-absorption capacity

The quantity of benzene in % by weight, based on the quantity of active carbon used, adsorbed from an air stream with a benzene concentration corresponding to 90 % of the saturation concentration at 20°C.

b. Methylene blue number

The quantity in milliliters of a 0.15 % by weight aqueous methylene blue solution which is bleached by 100 mg of active carbon.

c. Abrasion test 6 balls weighing 8 g and 2 balls weighing 10 g are introduced together with 100 ml of moldings into a porcelain ball mill 7 cm in diameter and 9 cm long, and rotated for 1 hour at 100 r.p.m.. The breakage (smaller than 2.5 but larger than 0.075 mm) and the dust (smaller than 0.075 mm) is then sifted out and weighed.

d. Compression hardness

Load-bearing capacity of the test specimens under "top pressure" stressing up to failure.

A cylindrical molding approximately 4 mm in diameter and 8 to 12 mm long is placed at both ends on a firm substrate. A length of about 4 mm is left unsupported by a substrate in the middle of the molding. A punch acts on this part of the test specimen with increasing force. The force acting on the test specimen at the moment of failure is measured.

EXAMPLE 1

A finely ground mineral coal (screening residue above 0.075 mm approximately 10 %) was mixed at room temperature with a water-soluble precondensed resin based on phenolformaldehyde (prepared in accordance with Ullmann, 13, pages 453 to 478) and water in a ratio of 4.25: 1:1.15, the resulting mixture was processed for 1 hour in a kneader to form a plastic mass and was subsequently converted in a screw extruder into strands having a diameter of approximately 5.5 mm. The strands were cut into cylindrical moldings, 6 to 12 mm long. The moldings obtained in this way were allowed to stand for 12 hours at room temperature, and were then heated to 180°C in a slowly rotating, directly heated tubular rotary kiln at a rate of 60°C per hour. Subsequent low-temperature carbonization was carried out in a reducing atmosphere in the same rotary kiln rotating at a higher speed and at a heating rate of 75°C per hour to 650°C. The material was left at this temperature for 2 hours. This was followed by activation in the same unit in the presence of steam at 850° to 920°C.

The activated moldings had a diameter of from 4.2 to 4.5 mm and a length of approximately from 4 to 10 mm. Their absorption capacity for benzene from the gas phase amounted to 47 % by weight and their methylene blue number to 16. The abrasion and breakage test in the ball mill produced values of 0.1 %, while the load-bearing capacity of the moldings up to failure under top-pressure stressing (compression hardness) amounted on average to 22 kp.

Examples 2 to 7 (Table) were carried out in the same way as Example 1. Any differences and the properties measured are shown in the Table:

| Example | Starting material | Resin | Starting material: Resin: Water ratio | Residence time at room temperature | Heating to 180° |
|---|---|---|---|---|---|
| | | | | h | °C/h |
| 2 | Brown coal | Phenol | | | |

-continued

| Example | Starting material | Resin | Starting material: Resin: Water ratio | Residence time at room temperature h | Heating to 180° °C/h |
|---|---|---|---|---|---|
|  | low-temperature coke | formaldehyde | 2.5:1.0:1.4 | 4 | 30 |
| 3 | Fat coal: Brown coal low temperature coke 75:25 | Phenol-formaldehyde | 3.0:1.0:1.4 | 4 | 30 |
| 4 | Fat coal | Phenol-benzaldehyde | 2.0:1.0:0.0 | 12 | 60 |
| 5 | Fat coal | Phenol-benzaldehyde | 1.8:1.0:0.0 | 12 | 60 |
| 6 | Fat Coal | Resorcinol-formaldehyde | 1.8:1.0:0.0 | 12 | 60 |
| 7 | Fat Coal | 1-Naphthol-7-sulfonic acid formaldehyde | 4.0:1.0:1.4 | 48 | 50 |

| Example | Heating rate from 180°C to 650°C °C/h | Residence time at 650°C h | Benzene-absorption capacity % | Methylene-blue adsorption capacity ml | Ball mill hardness Dust % | Ball mill hardness Breakage % | Compression hardness kp |
|---|---|---|---|---|---|---|---|
| 2 | 50 | 1 | 42.6 | 12 | 0.5 | 0.7 | 19.3 |
| 3 | 50 | 1 | 47.2 | 12 | 0.6 | 0.9 | 17.8 |
| 4 | 80 | 0.5 | 44.7 | 18 | 0.2 | 0.4 | 25.3 |
| 5 | 80 | 0.5 | 42.4 | 14 | 0.4 | 0.5 | 16.6 |
| 6 | 80 | 0.5 | 39.9 | 13 | 0.2 | 0.5 | 18.6 |
| 7 | 75 | 1 | 44.2 | 20 | 0.1 | 0.3 | 18.4 |

The preceding Examples show that the molded carbons produced show favorable adsorption properties and a hitherto unknown level of compression hardness. By contrast, commercially available active carbons have compression hardnesses of from about 4 to 13 kp.

It will be appreciated that the instant specification and examples are set forth by way of illustration and not limitation, and that various modifications and changes may be made without departing from the spirit and scope of the present invention.

What is claimed is:

1. In the production of break-resistant and abrasion-resistant shaped structures of active carbon, comprising the steps of molding a finely divided, carbon-containing starting material with a binder, hardening the molding, eliminating volatile constituents therefrom and activating the molding at a temperature of about 700° to 1200°C with at least one of steam and carbon dioxide, the improvement which comprises molding a carbon-containing material selected from the group consisting of mineral coal, brown coal coke, charcoal, coconut shell coke, peat coke, petroleum coke, acid-sludge coke, a coke-like residue from the thermal decomposition of a synthetic resin and mixtures of these substances, with a binder comprising a mixture of a phenol and an aldehyde or a water soluble pre-condensed resin thereof, the phenol being at least one member selected from the group consisting of phenol, cresol, xylenol and naphthol, and the aldehyde being at least one member selected from the group consisting of formaldehyde, metaldehyde, paraldehyde, acetaldehyde and benzaldehyde, the moldings being stored for about 1 to 24 hours prior to hardening.

2. A process as claimed in claim 1, wherein the moldings are hardened at a temperature of about 20° to 750°C, accompanied by removal of the volatile constituents.

3. A process as claimed in claim 2, wherein hardening is carried out in two stages, in the first of which the moldings are heated to a temperature of about 150 to 200°C at a rate of about 30° to 60°C per hour, and, in the second stage, to a temperature of about 600° to 700°C at a rate of about 40° to 120°C per hour.

4. A process as claimed in claim 3, wherein the second stage is carried out in a low-oxygen atmosphere.

5. A process as claimed in claim 4, wherein the carbon-containing starting material is mixed with the binder in about 30–85 : 70–15 parts by weight.

* * * * *